(12) United States Patent
Duong et al.

(10) Patent No.: US 11,415,012 B1
(45) Date of Patent: Aug. 16, 2022

(54) TANDEM STATOR WITH DEPRESSIONS IN GASPATH WALL

(71) Applicant: PRATT & WHITNEY CANADA CORP., Longueuil (CA)

(72) Inventors: Hien Duong, Mississauga (CA); Vijay Kandasamy, T. Palur (IN)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/466,187

(22) Filed: Sep. 3, 2021

(51) Int. Cl.
*F01D 9/04* (2006.01)
*F01D 5/14* (2006.01)

(52) U.S. Cl.
CPC ............. *F01D 9/041* (2013.01); *F01D 5/141* (2013.01); *F05D 2220/32* (2013.01); *F05D 2220/323* (2013.01); *F05D 2240/12* (2013.01)

(58) Field of Classification Search
CPC ...... F01D 9/041; F01D 5/141; F05D 2220/32; F05D 2220/323
See application file for complete search history.

(56) References Cited

U.S. PATENT DOCUMENTS

| | | | |
|---|---|---|---|
| 8,469,659 B2 * | 6/2013 | Sakamoto | F01D 11/08 415/191 |
| 8,684,684 B2 | 4/2014 | Clements et al. | |
| 8,834,129 B2 * | 9/2014 | Barnes | F01D 5/34 416/193 A |
| 9,874,101 B2 * | 1/2018 | Xu | F01D 5/143 |
| 9,951,635 B2 | 4/2018 | Guemmer | |
| 10,221,710 B2 * | 3/2019 | Winn | F01D 9/041 |
| 10,584,604 B2 * | 3/2020 | Guemmer | F01D 9/042 |
| 10,590,781 B2 * | 3/2020 | Correia | F01D 5/143 |
| 10,704,393 B2 * | 7/2020 | Maatouk | F01D 9/041 |
| 10,830,073 B2 | 11/2020 | Aggarwala | |
| 10,890,072 B2 * | 1/2021 | Balzer | F01D 5/143 |
| 10,934,849 B2 * | 3/2021 | Brettschneider | F01D 9/041 |
| 11,033,992 B2 | 6/2021 | Macfarlane et al. | |
| 2010/0143139 A1 * | 6/2010 | Pandey | F01D 5/143 416/223 R |
| 2010/0196154 A1 * | 8/2010 | Sakamoto | F01D 9/041 415/208.2 |
| 2010/0284818 A1 * | 11/2010 | Sakamoto | F01D 5/143 416/241 R |
| 2021/0017862 A1 * | 1/2021 | Gustafson | F01D 5/143 |
| 2021/0115798 A1 | 4/2021 | Gustafson et al. | |

* cited by examiner

*Primary Examiner* — Michael Lebentritt
*Assistant Examiner* — Brian Christopher Delrue
(74) *Attorney, Agent, or Firm* — Norton Rose Fulbright Canada LLP.

(57) ABSTRACT

A fluid machine has: first and second walls; a gaspath defined between the first wall and the second wall; a rotor having blades rotatable about the central axis; and a tandem having: a first row of first vanes having first airfoils including first leading edges, first trailing edges, first pressure sides and first suction sides opposed the first pressure sides, and a second row of second vanes downstream of the first vanes and having second airfoils including second leading edges, second trailing edges, second pressure sides and second suction sides opposed the second pressure sides, the first vanes being circumferentially offset from the second vanes; and depressions defined in the first wall, a depression of the depressions located circumferentially between a pressure side of the first pressure sides and a suction side of the second suction sides, the depressions axially overlapping the first airfoils and the second airfoils.

20 Claims, 4 Drawing Sheets

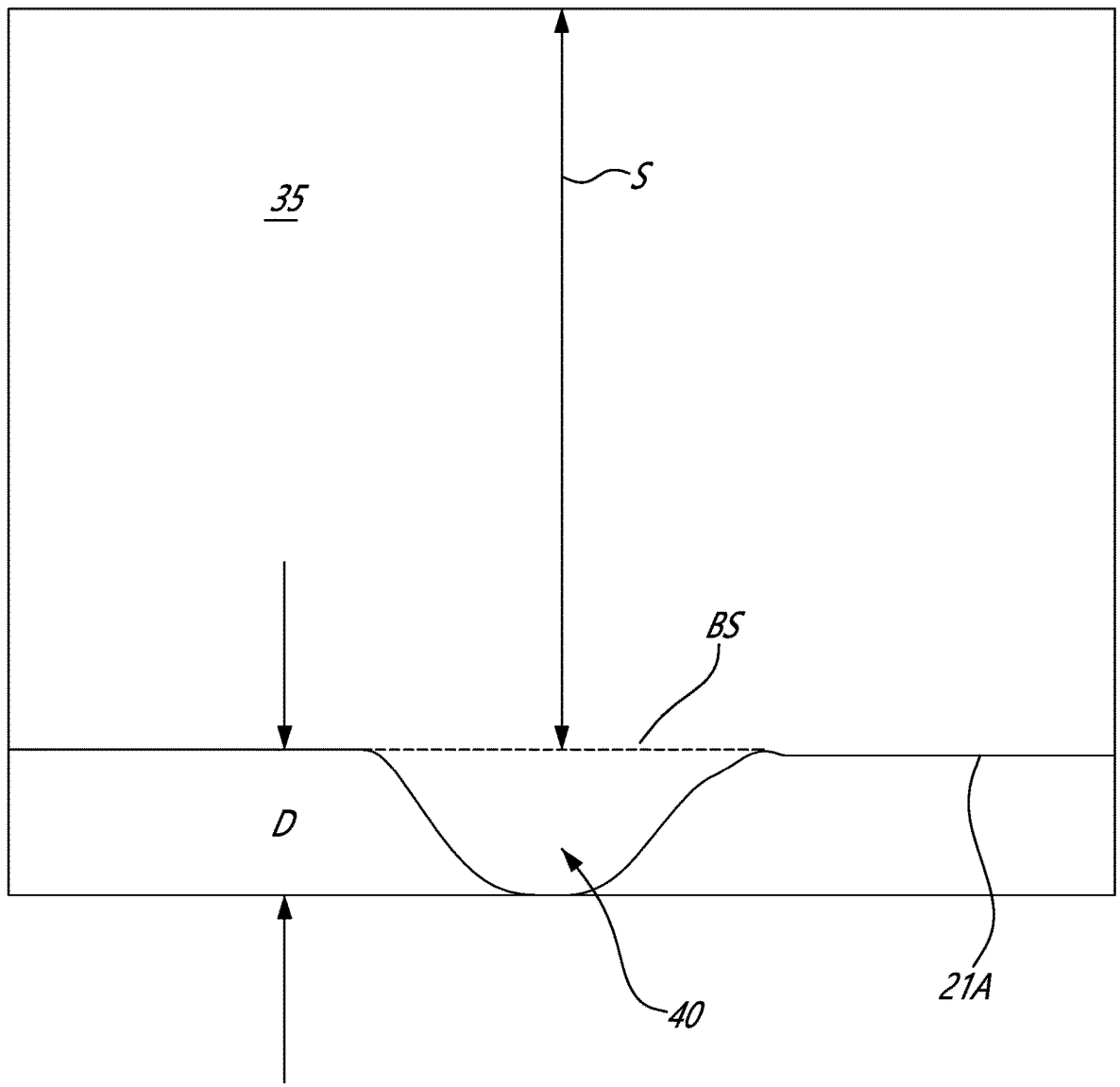

US 11,415,012 B1

TANDEM STATOR WITH DEPRESSIONS IN GASPATH WALL

TECHNICAL FIELD

The application relates generally to aircraft engines, such as gas turbine engines and, more particularly, to compressors and turbines of such engines.

BACKGROUND

Tandem stators (i.e. two stator rows located in immediate succession) are sometimes used in compressors with very high pressure ratios, when high flow turning and/or high Mach number flow is required. However, when such compressors are operating at off-design conditions, there can be large distortions in the flow at the inlet to the first stator and/or downstream of the compressor rotor.

Obtaining an acceptable performance and operating range from tandem stator designs can therefore be challenging, given that physical constraints on engine weight and overall compressor length can impose restrictions on stator length, number of stators, gas path size/shape, etc. Improvements are therefore sought.

SUMMARY

In one aspect, there is provided a fluid machine for an aircraft engine comprising: a first wall and a second wall circumferentially extending around a central axis; a gaspath defined between the first wall and the second wall; a rotor having blades circumferentially distributed around the central axis and extending across the gaspath, the rotor rotatable about the central axis; and a tandem stator in fluid communication with the rotor and having: a first row of first vanes extending across the gaspath and circumferentially distributed around the central axis, the first vanes having first airfoils including first leading edges, first trailing edges, first pressure sides and first suction sides opposed the first pressure sides, and a second row of second vanes downstream of the first vanes and extending across the gaspath, the second vanes circumferentially distributed about the central axis, the second vanes having second airfoils including second leading edges, second trailing edges, second pressure sides and second suction sides opposed the second pressure sides, the first vanes being circumferentially offset from the second vanes; and depressions defined in the first wall, the depressions extending from a baseline surface of the first wall away from the second wall, a depression of the depressions located circumferentially between a pressure side of the first pressure sides and a suction side of the second suction sides, the depressions axially overlapping the first airfoils and the second airfoils relative to the central axis.

The fluid machine may include any of the following features, in any combinations.

In some embodiments, a ratio of a width (L) of the depression taken along a circumferential direction relative to the central axis to a circumferential length (C) taken along the circumferential direction from the first trailing edges to the second leading edges ranges from 0.3 to 0.9.

In some embodiments, a ratio of a length (L) of the depression taken along an axial direction relative to the central axis to a total axial length (Lt) of the tandem stator along the axial direction from the first leading edges to the second trailing edges ranges from 0.15 to 0.75.

In some embodiments, a ratio of a depth (D) of the depression taken along a radial direction relative to the central axis to a span (S) of the first airfoils ranges from 0.05 to 0.1.

In some embodiments, a ratio of a distance (A) taken along an axial direction relative to the central axis from the first leading edges to an upstream end of the depression to an axial length (Ls1) taken along the axial direction from the first leading edges to the first trailing edges ranges from 0.5 to 0.8.

In some embodiments, the depression has a width taken in a circumferential direction relative to the central axis, the width being maximal at an axial location registering with the first trailing edges.

In some embodiments, the first vanes are circumferentially offset from the second vanes such that a circumferential position of each of the first vanes is located between circumferential positions of two corresponding adjacent ones of the second vanes.

In some embodiments, the first wall is located radially inwardly of the second wall relative to the central axis.

In some embodiments, the first wall and the second wall extend towards the central axis in a flow direction of a flow flowing between the first vanes and the second vanes.

In some embodiments, the fluid machine is a compressor.

In some embodiments, the fluid machine is a turbine.

In another aspect, there is provided an aircraft engine comprising: a compressor section having: a first wall and a second wall circumferentially extending around a central axis; a gaspath defined between the first wall and the second wall; a rotor having blades circumferentially distributed around the central axis and extending across the gaspath, the rotor rotatable about the central axis; and a tandem stator in fluid communication with the rotor and having: a first row of first vanes extending across the gaspath and circumferentially distributed around the central axis, the first vanes having first airfoils including first leading edges, first trailing edges, first pressure sides and first suction sides opposed the first pressure sides, and a second row of second vanes downstream of the first vanes and extending across the gaspath, the second vanes circumferentially distributed about the central axis, the second vanes having second airfoils including second leading edges, second trailing edges, second pressure sides and second suction sides opposed the second pressure sides, the first vanes being circumferentially offset from the second vanes; and depressions defined in the first wall, the depressions extending from a baseline surface of the first wall away from the second wall, a depression of the depressions located circumferentially between a pressure side of the first pressure sides and a suction side of the second suction sides, the depressions axially overlapping the first airfoils and the second airfoils relative to the central axis.

The aircraft engine may include any of the following features, in any combinations.

In some embodiments, a ratio of a width (W) of the depression taken along a circumferential direction relative to the central axis to a circumferential length (C) taken along the circumferential direction from the first trailing edges to the second leading edges ranges from 0.3 to 0.9.

In some embodiments, a ratio of a length (L) of the depression taken along an axial direction relative to the central axis to a total axial length (Lt) of the tandem stator along the axial direction from the first leading edges and the second trailing edges ranges from 0.15 to 0.75.

In some embodiments, a ratio of a depth (D) of the depression taken along a radial direction relative to the central axis to a span (S) of the first airfoils ranges from 0.05 to 0.1.

In some embodiments, a ratio of a distance (A) taken along the axial direction from the first leading edges to an upstream end of the depression to an axial length (Ls1) taken along the axial direction from the first leading edges to the first trailing edges ranges from 0.5 to 0.8.

In some embodiments, the depression has a width taken in the circumferential direction relative to the central axis, the width being maximal at an axial location registering with the first trailing edges.

In some embodiments, the first vanes are circumferentially offset from the second vanes such that a circumferential position of each of the first vanes is located between circumferential positions of two corresponding adjacent ones of the second vanes.

In some embodiments, the first wall is located radially inwardly of the second wall relative to the central axis.

In some embodiments, the first wall and the second wall extend towards the central axis in a flow direction of a flow flowing between the first vanes and the second vanes.

BRIEF DESCRIPTION OF THE DRAWINGS

Reference is now made to the accompanying figures in which:

FIG. 4 is a cross-sectional view of a depression defined in a gaspath wall of the tandem stator of FIG. 2.

DETAILED DESCRIPTION

Figure 1:
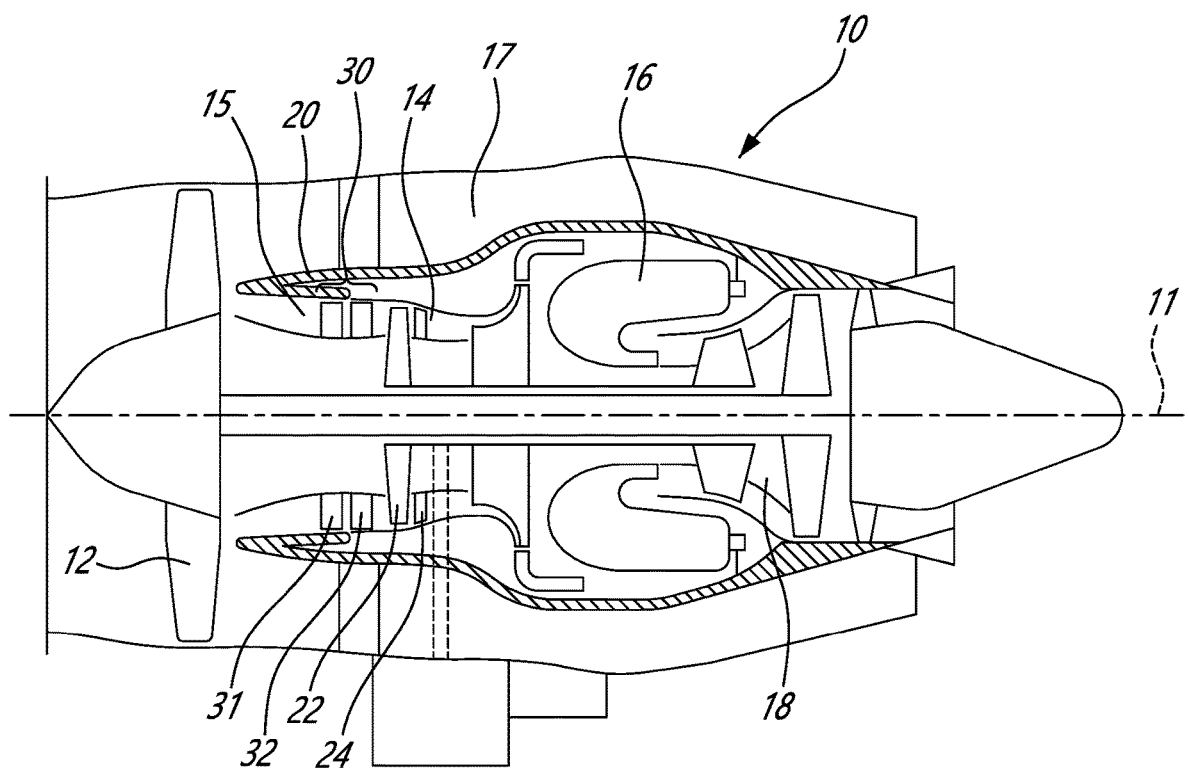
FIG. 1 is a schematic cross sectional view of an aircraft engine depicted as a gas turbine engine.

FIG. 1 illustrates an aircraft engine depicted as a gas turbine engine 10 of a type preferably provided for use in subsonic flight, generally comprising in serial flow communication a fan 12, a compressor section 14 for pressurizing the air, a combustor 16 in which the compressed air is mixed with fuel and ignited for generating an annular stream of hot combustion gases, and a turbine section 18 for extracting energy from the combustion gases. The fan 12, the compressor section 14, and the turbine section 18 are rotatable about a central axis 11 of the gas turbine engine 10. The principles of the present disclosure may apply to any gas turbine engine such as turboprop and turboshaft gas turbine engines.

The compressor section 14 includes one or more compressor rotors 22 and stators 24 in fluid communication with the rotors 22. The exemplary gas turbine engine 10 of FIG. 1 is a turbofan engine including the fan 12 through which ambient air is propelled. An airflow flowing between blades of the fan 12 is split between an engine core gaspath 15 and a bypass flow path 17 downstream of the fan 12. The gas turbine engine 10 has an engine casing 20 that circumferentially extends around the central axis 11. The core gaspath 15 is therefore located radially inwardly of the engine casing 20 relative to the central axis 11 and the bypass flow path 17 located radially outwardly of the engine casing 20 relative to the central axis 11.

As will be described in further detail below, the compressor section 14 of the gas turbine engine 10 includes at least one compression stage having a tandem stator assembly 30 (which may be alternately referred to as a dual stator assembly), composed of two individual stators, namely a first stator 31 and a second stator 32 in immediate flow-wise succession (i.e. without any rotor therebetween); the second stator 32 located downstream of the first stator 31 relative to the air flow flowing in the core gaspath 15. In the embodiment depicted in FIG. 1, the tandem stator assembly 30 is shown as being part of the first compression stage, that is it is located downstream of the fan 12 at the inlet of a core of the engine 10 and within the engine core gaspath 15. It is to be understood, however, that the present tandem stator assembly 30 may form part of other compression stages, such as those further downstream within the core of the gas turbine engine 10, either instead of or addition to being immediately downstream from the fan 12. In some embodiments, the tandem stator assembly 30 may be used in a turbine stage of the turbine section 18. The tandem stator assembly 30 may be used in the bypass flow path 17.

Figure 2:
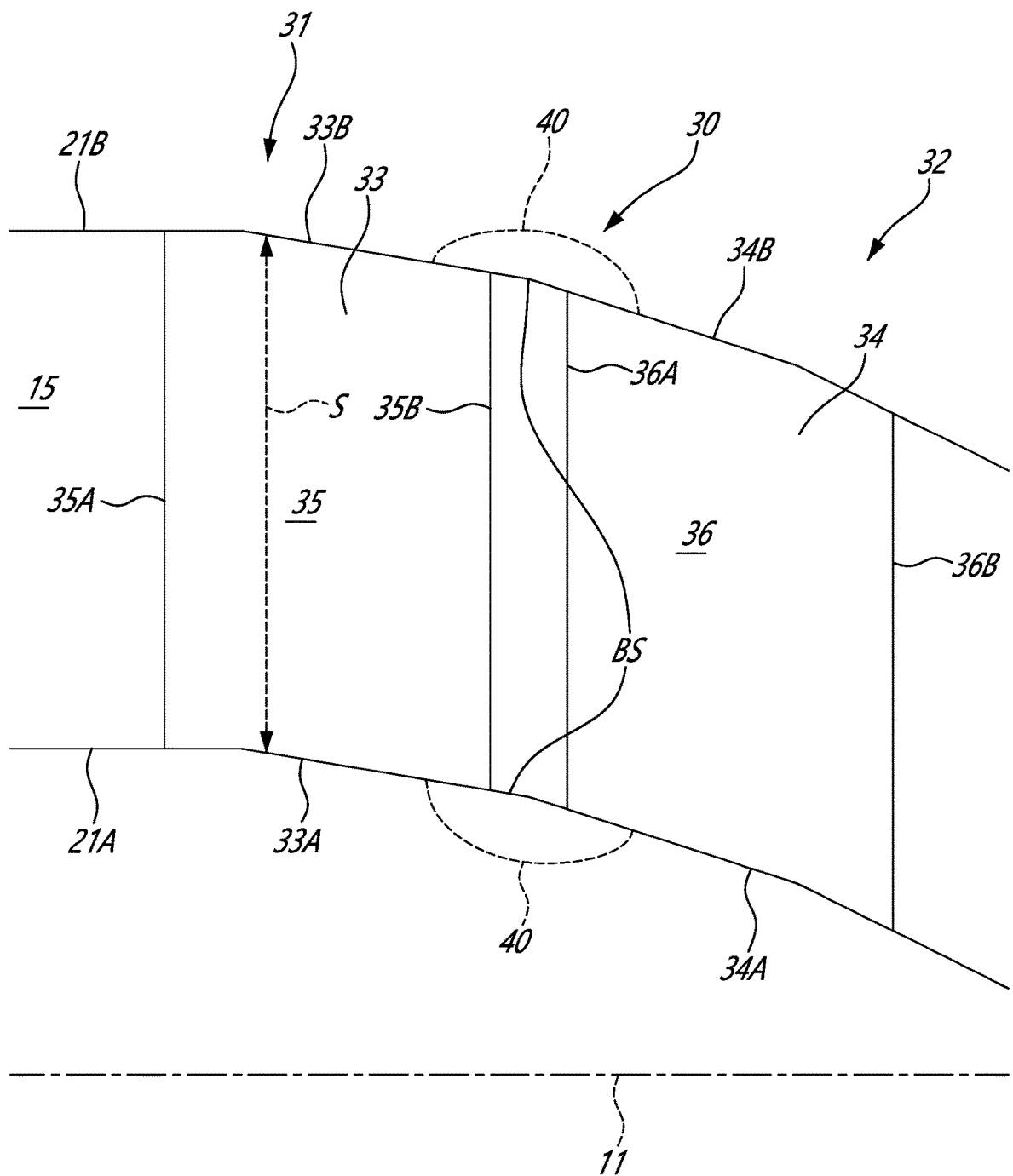
FIG. 2 is a schematic cross-sectional view of a tandem stator to be used in a compressor or a turbine of the gas turbine engine of FIG. 1, the cross-sectional view taken on a plane containing a central axis of the gas turbine engine of FIG. 1.

Referring more particularly to FIG. 2, the core gaspath 15 is defined radially between an inner gaspath wall 21A, which may include vane platforms (not shown), and an outer gaspath wall 21B, which may include vane shroud (not shown). The outer gaspath wall 21B is located radially outwardly of the inner gaspath wall 21A relative to the central axis 11.

The first stator 31 includes a first row of a plurality of first vanes 33 and the second stator 32 includes a second row of a plurality of second vanes 34. The first vanes 33 and the second vanes 34 are circumferentially distributed around the central axis 11. The first vanes 33 may be staggered relative to the second vanes 34. In other words, a circumferential position of each of the first vanes 33 may be between circumferential positions of two circumferentially adjacent ones of the second vanes 34. This configuration is shown more clearly in FIG. 3. The first vanes 33 extend from first inner ends 33A at the inner gaspath wall 21A to first outer ends 33B at the outer gaspath wall 21B. The second vanes 34 extend from second inner ends 34A at the inner gaspath wall 21A to second outer ends 34B at the outer gaspath wall 21B. The first and second vanes 33, 34 may be overlapped. The first and second vanes 33, 34 may be cantilevered. A number of the first vanes 33 may be different (e.g., more or less) than a number of the second vanes 34.

Figure 3:
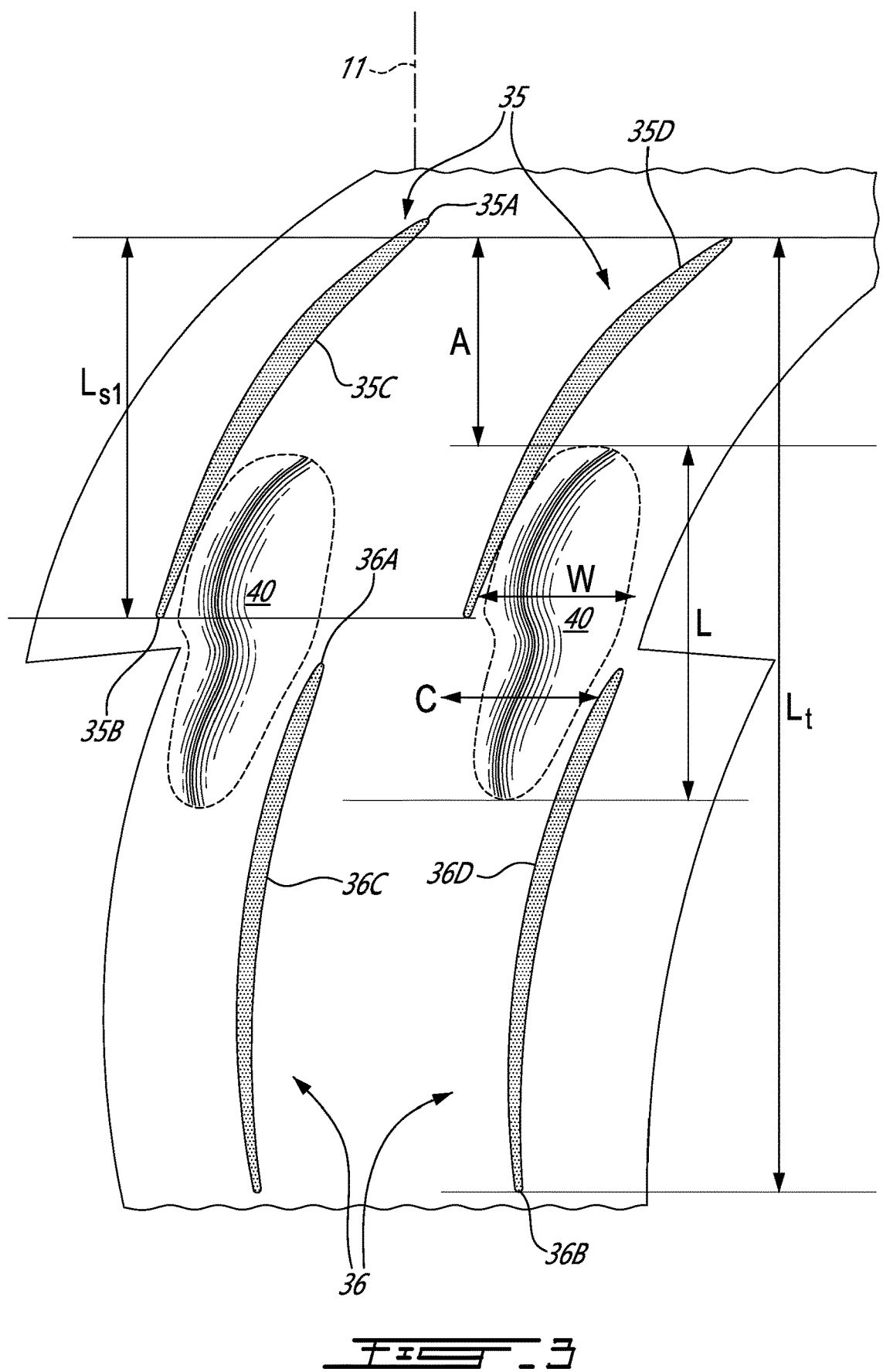
FIG. 3 is a schematic cross-sectional view of the tandem stator of FIG. 2 taken on a plane normal to a radial direction relative to the central axis of the gas turbine engine of FIG. 1.

Referring to FIGS. 2-3, the first vanes 33 include first airfoils 35 having first leading edges 35A, first trailing edges 35B downstream of the first leading edges 35A, first pressure sides 35C (FIG. 3), and first suction sides 35D (FIG. 3) opposed the first pressure sides 35C. The first airfoils 35 extend in a direction having a radial component relative to the central axis 11 from the inner gaspath wall 21A to the outer gaspath wall 21B. The second vanes 34 include second airfoils 36 that extend in a direction having a radial component relative to the central axis 11 from the inner gaspath wall 21A to the outer gaspath wall 21B. The second airfoils 36 have second leading edges 36A, second trailing edges 36B downstream of the second leading edges 36A, second pressure sides 36C (FIG. 3), and second suction sides 36D (FIG. 3) opposed the second pressure sides 36C.

In the embodiment shown, the first airfoils 35 are offset from the second airfoils 36 such that the second leading edges 36A are located downstream of the first trailing edges 35B relative to the air flow flowing in the core gaspath 15. An axial offset is therefore defined between the second leading edges 36A and the first trailing edges 35B. In some embodiments, the first airfoils 35 may be at least partially axially overlapped by the second airfoils 36 such that the second leading edges 36A are located upstream of the first trailing edges 36A. In some embodiments, the second leading edges 36A may be axially aligned with the first trailing edges 36A.

It was observed that secondary flows exist in the second stator 32 due to boundary layer build up from the first stator 31 and due to large pressure gradients required to turn the air flow in the second stator 32. Cross flow may be collected on the second suction sides 36D of the second airfoils 36 of the second stator 32 and radially outwardly along the surface before shedding above hub corner. Moreover, in the embodiment shown, the core gaspath 15 extends toward the central axis 11 in the flow direction. In other words, both of the inner gaspath wall 21A and the outer gaspath wall 21B extend both axially and radially inwardly along a flow direction of the flow flowing in the core gaspath 15. In some embodiments, the core gaspath 15 may extend toward the central axis 11 from a location downstream of the second stator 32. This falling gaspath configuration may create a reduced shroud static pressure that may further contribute in driving up the cross flow further up the second stator 32. Large cross flows can contribute to large stator losses, reduced stall range, and may be detrimental to performance of other components (e.g., rotors) downstream of the tandem stator 30.

Still referring to FIGS. 2-3, the tandem stator 30 includes depressions 40 that are defined in one or both of the inner gaspath wall 21A and the outer gaspath wall 21B. The depressions 40 extend from a baseline surface BS of the inner gaspath wall 21A and/or the outer gaspath wall 21B and away from the core gaspath 15. The baseline surface BS is a surface of the gaspath walls free of the depressions 40. As shown in FIG. 3, the depressions 40 are located circumferentially between the first pressure sides 35C and the second suction sides 36D. The depressions 40 axially overlap both of the first airfoils 35 and the second airfoils 36 relative to the central axis 11. In other words, and in the depicted embodiment, upstream ends of the depressions 40 are located upstream of the first trailing edges 35B and downstream ends of the depressions 40 are located downstream of the second leading edges 36A.

The depressions 40 may overlap the first airfoils along half the length of the depression and may overlap the second airfoils along a remaining half of the length of the depressions 40. A major portion (e.g. 50% or more) of the depressions 40 may be located downstream of a mid-chord location of the first airfoils and upstream of a mid-chord location of the second airfoil. The depressions 40 may extend from upstream ends to downstream ends. The upstream ends may be located downstream of a mid-chord location of the first airfoils. The downstream ends may be located upstream of a mid-chord location of the second airfoils. Each of the depressions 40 may be entirely contained circumferentially between the pressure sides of the first airfoils and the suction sides of the second airfoils. In other words, areas between the suction sides of the first airfoils and the pressure sides of the second airfoils may remain free of the depressions.

Referring more particularly to FIGS. 3-4, a ratio of a width W of the depressions 40 taken along a circumferential direction relative to the central axis 11 to a circumferential length C taken along the circumferential direction from the first trailing edges 35B to the second leading edges 36A may range from 0.3 to 0.9. A ratio of a length L of the depressions 40 taken along an axial direction relative to the central axis 11 to a total axial length $L_t$ of the tandem stator 30 taken along the axial direction from the first leading edges 35A to the second trailing edges 36B may range from 0.15 to 0.75. A ratio of a depth D of the depressions 40 taken along a radial direction relative to the central axis 11 to a span S (FIG. 2) of the first airfoils 35 may range from 0.05 to 0.1. The span S of the first airfoils 35 extends from the inner gaspath wall 21A to the outer gaspath wall 21B along the radial direction. The depth D may extend from the baseline surface BS to deepest locations of the depressions 40. A ratio of a distance A taken along the axial direction relative to the central axis 11 from the first leading edges 35A to upstream ends of the depressions 40 to an axial length of the first stator 31 along the axial direction from the first leading edges 35A to the first trailing edges 35B may range from 0.5 to 0.8. In the embodiment shown, the width W of the depressions is maximal at an axial location registering with the first trailing edges 35B. In some embodiments, the location of maximal width may be located at another location. The location where the depth D of the depressions 40 is maximal may be located downstream of first trailing edges 35B and near the throats of the second stator 32. The throats of the second stator 32 extend from the second leading edges 36A to the second suction sides 36D.

The depressions 40 are located in the vicinity of the first trailing edges 35B and of the second leading edges 36A and may reduce pressure gradient; increase static pressure on area between the first trailing edges 35B and the second leading edges 36A, and may help to reduce pressure gradients across the second stator 32. The depressions 40 may be asymmetrical with respect to a plane containing the central axis 11 and intersecting a center of a space between the first vanes and the second vanes 33, 34. The depressions 40 may help in reducing radial streamlines, which may result in more streamlines following the general flow direction. The depressions 40 may reduce merging of stator wakes, which may result in less blockage compared to a configuration lacking the depressions 40. The depressions 40 may be used for a tandem stator in which an axial overlap is present between the first stator 31 and the second stator 32. The depressions 40 may help in reducing cross flow and secondary flow, which may improve stall margin and overall performance of the compressor. In some embodiments, the downstream ends of the depressions 40 may be located proximate or downstream of throats of the second stator 32. The throats of the second stator 32 extend from the second leading edges 36A to the second suction sides 36D.

The terms "downstream" and "upstream" as used herein are all with reference to a direction of the main airflow through the core gaspath 15. In the context of the present disclosure, the expression "fluid machine" includes compressors and turbines.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A fluid machine for an aircraft engine comprising:
a first wall and a second wall circumferentially extending around a central axis;
a gaspath defined between the first wall and the second wall;
a rotor having blades circumferentially distributed around the central axis and extending across the gaspath, the rotor rotatable about the central axis; and
a tandem stator in fluid communication with the rotor and having:
a first row of first vanes extending across the gaspath and circumferentially distributed around the central axis, the first vanes having first airfoils including first leading edges, first trailing edges, first pressure sides and first suction sides opposed the first pressure sides, and
a second row of second vanes downstream of the first vanes and extending across the gaspath, the second vanes circumferentially distributed about the central axis, the second vanes having second airfoils including second leading edges, second trailing edges, second pressure sides and second suction sides opposed the second pressure sides, the first vanes being circumferentially offset from the second vanes; and
depressions defined in the first wall, the depressions extending from a baseline surface of the first wall away from the second wall, a depression of the depressions located circumferentially between a pressure side of the first pressure sides and a suction side of the second suction sides, the depressions axially overlapping the first airfoils and the second airfoils relative to the central axis.

2. The fluid machine of claim 1, wherein a ratio of a width (W) of the depression taken along a circumferential direction relative to the central axis to a circumferential length (C) taken along the circumferential direction from the first trailing edges to the second leading edges ranges from 0.3 to 0.9.

3. The fluid machine of claim 1, wherein a ratio of a length (L) of the depression taken along an axial direction relative to the central axis to a total axial length ($L_t$) of the tandem stator along the axial direction from the first leading edges to the second trailing edges ranges from 0.15 to 0.75.

4. The fluid machine of claim 1, wherein a ratio of a depth (D) of the depression taken along a radial direction relative to the central axis to a span (S) of the first airfoils ranges from 0.05 to 0.1.

5. The fluid machine of claim 1, wherein a ratio of a distance (A) taken along an axial direction relative to the central axis from the first leading edges to an upstream end of the depression to an axial length ($L_{s1}$) taken along the axial direction from the first leading edges to the first trailing edges ranges from 0.5 to 0.8.

6. The fluid machine of claim 1, wherein the depression has a width taken in a circumferential direction relative to the central axis, the width being maximal at an axial location registering with the first trailing edges.

7. The fluid machine of claim 1, wherein the first vanes are circumferentially offset from the second vanes such that a circumferential position of each of the first vanes is located between circumferential positions of two corresponding adjacent ones of the second vanes.

8. The fluid machine of claim 1, wherein the first wall is located radially inwardly of the second wall relative to the central axis.

9. The fluid machine of claim 1, wherein the first wall and the second wall extend towards the central axis in a flow direction of a flow flowing between the first vanes and the second vanes.

10. The fluid machine of claim 1, wherein the fluid machine is a compressor.

11. The fluid machine of claim 1, wherein the fluid machine is a turbine.

12. An aircraft engine comprising:
a compressor section having:
a first wall and a second wall circumferentially extending around a central axis;
a gaspath defined between the first wall and the second wall;
a rotor having blades circumferentially distributed around the central axis and extending across the gaspath, the rotor rotatable about the central axis; and
a tandem stator in fluid communication with the rotor and having:
a first row of first vanes extending across the gaspath and circumferentially distributed around the central axis, the first vanes having first airfoils including first leading edges, first trailing edges, first pressure sides and first suction sides opposed the first pressure sides, and
a second row of second vanes downstream of the first vanes and extending across the gaspath, the second vanes circumferentially distributed about the central axis, the second vanes having second airfoils including second leading edges, second trailing edges, second pressure sides and second suction sides opposed the second pressure sides, the first vanes being circumferentially offset from the second vanes; and
depressions defined in the first wall, the depressions extending from a baseline surface of the first wall away from the second wall, a depression of the depressions located circumferentially between a pressure side of the first pressure sides and a suction side of the second suction sides, the depressions axially overlapping the first airfoils and the second airfoils relative to the central axis.

13. The aircraft engine of claim 12, wherein a ratio of a width (W) of the depression taken along a circumferential direction relative to the central axis to a circumferential length (C) taken along the circumferential direction from the first trailing edges to the second leading edges ranges from 0.3 to 0.9.

14. The aircraft engine of claim 13, wherein a ratio of a length (L) of the depression taken along an axial direction relative to the central axis to a total axial length ($L_t$) of the tandem stator along the axial direction from the first leading edges and the second trailing edges ranges from 0.15 to 0.75.

15. The aircraft engine of claim 14, wherein a ratio of a depth (D) of the depression taken along a radial direction relative to the central axis to a span (S) of the first airfoils ranges from 0.05 to 0.1.

16. The aircraft engine of claim 15, wherein a ratio of a distance (A) taken along the axial direction from the first leading edges to an upstream end of the depression to an axial length (Li) taken along the axial direction from the first leading edges to the first trailing edges ranges from 0.5 to 0.8.

17. The aircraft engine of claim 16, wherein the depression has a width taken in the circumferential direction relative to the central axis, the width being maximal at an axial location registering with the first trailing edges.

18. The aircraft engine of claim 17, wherein the first vanes are circumferentially offset from the second vanes such that a circumferential position of each of the first vanes is located between circumferential positions of two corresponding adjacent ones of the second vanes.

19. The aircraft engine of claim 18, wherein the first wall is located radially inwardly of the second wall relative to the central axis.

20. The aircraft engine of claim 19, wherein the first wall and the second wall extend towards the central axis in a flow direction of a flow flowing between the first vanes and the second vanes.

* * * * *